(No Model.)

F. I. MAULE.
LONG JOINT COUPLING.

No. 485,961. Patented Nov. 8, 1892.

Witnesses:
William D. Conner
Jno. E. Parker.

Inventor:
Francis I. Maule
by his Attorneys
Howson & Howson

United States Patent Office.

FRANCIS I. MAULE, OF PHILADELPHIA, PENNSYLVANIA.

LONG-JOINT COUPLING.

SPECIFICATION forming part of Letters Patent No. 485,961, dated November 8, 1892.

Application filed July 13, 1888. Serial No. 279,859. (No model.)

*To all whom it may concern:*

Be it known that I, FRANCIS I. MAULE, a citizen of the United States, and a resident of Philadelphia, Pennsylvania, have invented certain Improvements in Long-Joint Couplings, of which the following is a specification.

My invention relates to that class of couplings known as "long-joint" or "long-screw" couplings which are interposed between the ends of fixed pipes so as to provide a connection which can be readily removed when necessary without disturbing the pipes themselves, the object of my invention being to so construct such a long-joint coupling that leakage at that end of the same carrying the coupling-sleeve will be effectually prevented. This object I attain in the manner hereinafter set forth, reference being had to the accompanying drawings, in which—

Figure 1:
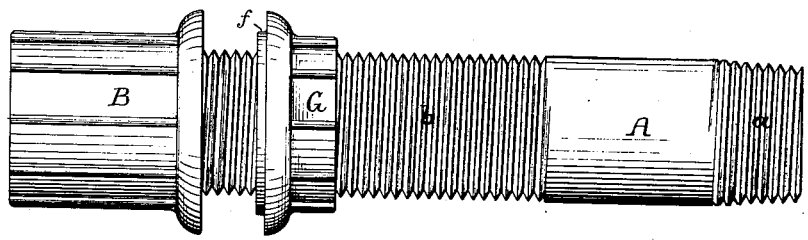
Figure 2:
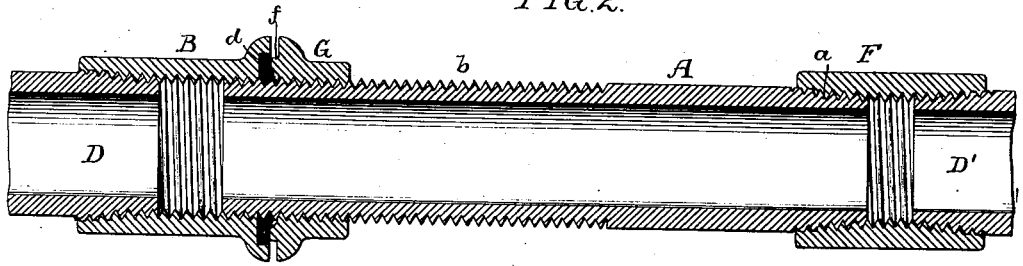

Figure 1 is a side view of a long-joint coupling constructed in accordance with my invention. Fig. 2 is a sectional view showing the coupling applied to the ends of the fixed pipes.

A long-joint or long-screw coupling usually consists of a tube A, having at one end a short thread $a$ and at the other end a long thread $b$, to which is adapted a long nut or internally-threaded sleeve B, which can be caused to project to any desired extent beyond the end of the tube A, so as to couple onto one of the fixed pipes D, the other fixed pipe D' being secured to the opposite end of the tube A by means of an ordinary coupling F. The thread $a$ of the coupling-tube and the threads on the ends of the pipes D D' are the usual tapered threads, so that the coupling F and the outer end of the coupling-sleeve B jam on the threads and make tight joints; but in this class of couplings difficulty is always experienced in making a tight joint at that end of the coupling-sleeve B which travels upon the thread $b$ of the pipe A, owing to the fact that this thread must necessarily be of uniform depth, so that there can be no jamming of the thread of the sleeve on that of the pipe to make a tight joint. In order to prevent leakage at the inner end of the sleeve B, therefore, I provide the same with a packing-ring $d$, of soft metal or alloy, adapted to an internal groove in the face of the sleeve, and I provide the locking-nut G, which travels on the screw-thread $b$, with a projecting annular rib or flange $f$, the latter bearing against the soft-metal packing-ring of the sleeve B when the lock-nut G is screwed up to its place. The packing-ring $d$ extends to the bore of the sleeve B and the rib $f$ on the lock-nut G is beveled on its inner face, as shown in Fig. 2, so that when the rib is pressed firmly against the packing-ring the latter will be spread radially and pressed tightly against the thread $b$ of the pipe A, so as to effectually prevent leakage at the joint.

The sleeve B and lock-nut G may be throughout of sufficient thickness to provide for the formation of a bearing rib or recess and packing-recess in the adjacent faces of the same; but I prefer to make the body of the sleeve and lock-nut comparatively thin and to increase the diameter of said sleeve and lock-nut at the adjacent faces, so as to provide for an extended bearing against the packing-ring without making the sleeve and nut of inconvenient size and weight.

Having thus described my invention, I claim and desire to secure by Letters Patent—

The combination of the coupling-tube having a projecting nut at one end and at the other end a threaded sleeve and lock-nut, said sleeve having a permanent soft-metal packing ring or washer let into the same and the lock-nut having a projecting rib for bearing upon said packing ring or washer, said rib being beveled on its inner periphery, substantially as specified.

In testimony whereof I have signed my name to this specification in the presence of two subscribing witnesses.

FRANCIS I. MAULE.

Witnesses:
 WILLIAM D. CONNER,
 HARRY SMITH.